(12) United States Patent
Hahn et al.

(10) Patent No.: US 8,102,766 B2
(45) Date of Patent: *Jan. 24, 2012

(54) METHOD AND SYSTEM FOR MANAGING TIME-SENSITIVE PACKETIZED DATA STREAMS AT A RECEIVER

(75) Inventors: Paul S. Hahn, Plano, TX (US); Michael E. Knappe, Sunnyvale, CA (US); Richard A. Dunlap, Euless, TX (US); Luke K. Surazski, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 562 days.

This patent is subject to a terminal disclaimer.

(21) Appl. No.: 11/555,752

(22) Filed: Nov. 2, 2006

(65) Prior Publication Data
US 2007/0058652 A1    Mar. 15, 2007

Related U.S. Application Data

(63) Continuation of application No. 09/848,923, filed on May 3, 2001, now Pat. No. 7,161,905.

(51) Int. Cl.
*H04J 3/14* (2006.01)
*H04Q 11/04* (2006.01)
*G10L 11/06* (2006.01)
*G10L 21/00* (2006.01)

(52) U.S. Cl. ........ 370/231; 370/235; 370/252; 370/389; 704/214; 704/215; 704/226

(58) Field of Classification Search .................. 370/231, 370/235, 252, 389; 704/214, 215, 226
See application file for complete search history.

(56) References Cited

U.S. PATENT DOCUMENTS

| 5,130,985 | A | 7/1992 | Kondo et al. | 370/400 |
|---|---|---|---|---|
| 5,699,481 | A | 12/1997 | Shlomot et al. | 704/228 |
| 5,737,695 | A * | 4/1998 | Lagerqvist et al. | 455/79 |
| 5,819,217 | A | 10/1998 | Raman | 704/233 |
| 6,157,653 | A | 12/2000 | Kline et al. | 370/412 |
| 6,223,154 | B1 * | 4/2001 | Nicholls et al. | 704/233 |
| 6,233,154 | B1 | 5/2001 | Farnworth et al. | 361/752 |
| 6,249,757 | B1 | 6/2001 | Cason | 704/214 |
| 6,259,691 | B1 | 7/2001 | Naudus | |
| 6,381,568 | B1 | 4/2002 | Supplee et al. | 704/210 |
| 6,404,746 | B1 | 6/2002 | Cave et al. | |
| 6,415,029 | B1 * | 7/2002 | Piket et al. | 379/406.04 |
| 6,434,606 | B1 | 8/2002 | Borella et al. | |
| 6,466,458 | B2 | 10/2002 | Zhang et al. | |
| 6,490,556 | B1 | 12/2002 | Graumann et al. | 704/233 |
| 6,526,140 | B1 | 2/2003 | Marchok et al. | 379/406.03 |
| 6,580,694 | B1 | 6/2003 | Baker | 370/252 |
| 6,597,961 | B1 | 7/2003 | Cooke | 700/94 |
| 6,658,027 | B1 | 12/2003 | Kramer et al. | 370/516 |
| 6,665,317 | B1 | 12/2003 | Scott | |
| 6,671,262 | B1 | 12/2003 | Kung et al. | |
| 6,684,273 | B2 | 1/2004 | Boulandet et al. | |
| 6,707,821 | B1 | 3/2004 | Shaffer et al. | 370/395.4 |

(Continued)

*Primary Examiner* — Alpus H Hsu
(74) *Attorney, Agent, or Firm* — Baker Botts L.L.P.

(57) ABSTRACT

According to one embodiment of the invention, a method for managing time-sensitive packetized data streams at a receiver includes receiving a time-sensitive packet of a data stream, analyzing an energy level of a payload signal of the packet, and determining whether to drop the packet based on the energy level of the payload signal.

17 Claims, 3 Drawing Sheets

U.S. PATENT DOCUMENTS

| | | |
|---|---|---|
| 6,731,649 B1 | 5/2004 | Silverman |
| 6,785,261 B1 | 8/2004 | Schuster et al. |
| 6,791,944 B1 * | 9/2004 | Demetrescu et al. ......... 370/235 |
| 6,807,193 B1 | 10/2004 | Beser |
| 6,826,174 B1 | 11/2004 | Erekson et al. |
| 6,829,244 B1 | 12/2004 | Wildfeuer et al. ............ 370/412 |
| 6,847,635 B1 | 1/2005 | Beser |
| 6,865,185 B1 | 3/2005 | Patel et al. |
| 6,940,826 B1 | 9/2005 | Simard et al. ................. 370/260 |
| 7,263,074 B2 * | 8/2007 | LeBlanc ...................... 370/286 |
| 7,835,311 B2 * | 11/2010 | LeBlanc ...................... 370/286 |

\* cited by examiner

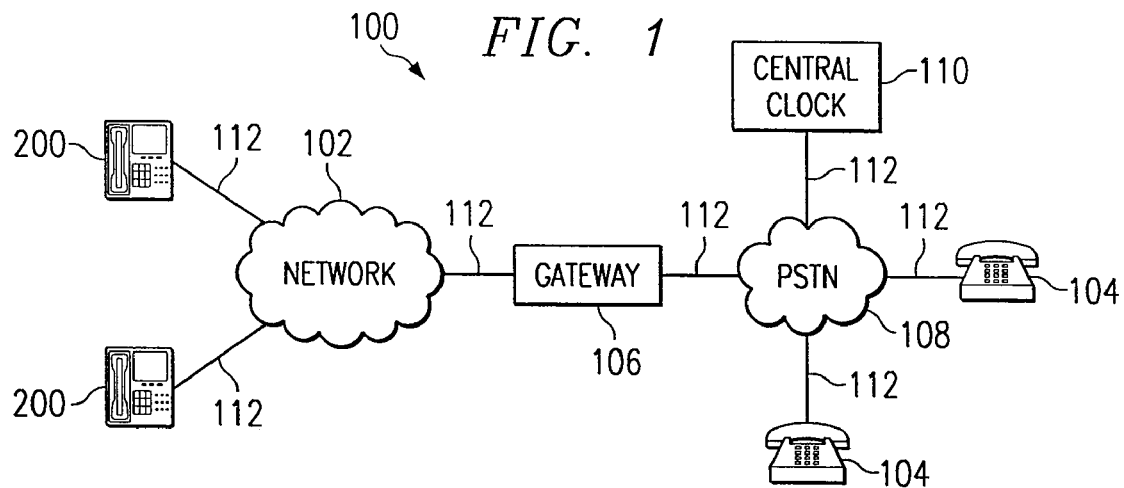
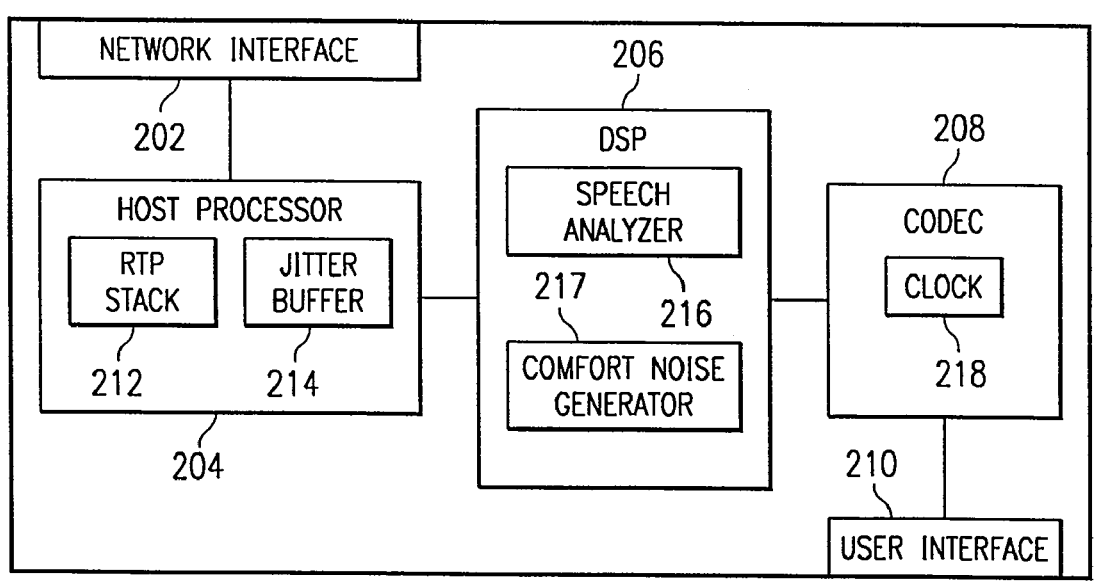

METHOD AND SYSTEM FOR MANAGING TIME-SENSITIVE PACKETIZED DATA STREAMS AT A RECEIVER

CROSS-REFERENCE TO RELATED APPLICATION

This application is a continuation of U.S. application Ser. No. 09/848,923 filed May 3, 2001 and entitled "Method and System for Managing Time-Sensitive Packetized Data Streams at a Receiver".

TECHNICAL FIELD OF THE INVENTION

The present invention relates generally to the field of communications systems, and more particularly to a method and system for managing time-sensitive packetized data streams at a receiver.

BACKGROUND OF THE INVENTION

Traditional circuit-switched communication networks have provided a variety of voice services to end users for many years. A recent trend delivers these voice services and other services, such as video and data, using networks that communicate information in packets. These packet-switched networks allow dynamic bandwidth and can be connectionless networks with no dedicated path or connection-oriented networks with virtual circuits having dedicated bandwidth along a predetermined path. Because packet-switched networks allow traffic from multiple users to share communication links, these networks use available bandwidth more efficiently than circuit-switched networks.

An Internet Protocol ("IP") network is an example of a connectionless packet-switched network that breaks up data streams, such as voice, video, or data, into addressable packets. Each IP packet includes source and destination addresses and traverses any available route between the source and destination. The IP packets are transmitted independently and then reassembled in the proper sequence at the destination.

For voice traffic, packets are fomatted and transmitted using the voice over IP ("VoIP") protocol. Unlike synchronous strata clock schemes in traditional circuit-switched networks, VoIP schemes use independent, free-running clocks for analog-to-digital and digital-to-analog conversions at the source and destination of a voice call. During a voice call, this clock independence, given enough time, eventually causes either a build-up of packets or a starvation of packets. Either condition severely degrades quality of service ("QoS") of VoIP data streams.

To enhance QoS for a VoIP connection, voice activity detection ("VAD") and comfort noise generation ("CNG") schemes have traditionally measured speech energy at the transmitting side, deciding whether or not to send packets to the receiving end based on a speech/no-speech decision. The receiving end has traditionally used the null time period in between speech utterances to adjust for time base discrepancies between send and receive. In addition, the receiving side provided some form of CNG during silent periods to keep the user from thinking the line has dropped. These schemes, however, are problematic with level and spectral mismatches that are created by user adjustments and that lower quality on that call.

SUMMARY OF THE INVENTION

In accordance with the present invention, a method and system for managing time-sensitive packetized data streams at a receiver is provided that addresses disadvantages and problems associated with previously developed systems and methods. In a particular embodiment, the present invention uses a receiver-side content prioritization scheme to compensate for lack of synchronization in packet-switched telephony systems.

According to one embodiment of the invention, a method for managing time-sensitive packetized data streams at a receiver includes receiving a time-sensitive packet of a data stream, analyzing an energy level of a payload signal of the packet, and determining whether to drop the packet based on the energy level of the payload signal.

Various embodiments of the invention provide a number of technical advantages. Embodiments of the invention may include all, some, or none of these advantages. One technical advantage is an improved method for compensating for lack of synchronization between endpoints over a packet-switched network. For example, the quality of service ("QoS") of VoIP systems, in which voice activity detection and/or comfort noise generation is not a requirement, is significantly enhanced in one or more embodiments of the invention. Another technical advantage of one or more embodiments is that no voice activity detection and/or comfort noise generation schemes are required between the send and receive sides of a communication network, which reduces complexity and expense while enhancing QoS. An additional technical advantage is improved IP telephones. A further technical advantage is an improved speech analyzer for enhancing QoS of VoIP systems.

Other technical advantages are readily apparent to one skilled in the art from the following figures, descriptions, and claims.

BRIEF DESCRIPTION OF THE DRAWINGS

For a more complete understanding of the invention, and for further features and advantages, reference is now made to the following description, taken in conjunction with the accompanying drawings, in which:

FIG. 1 is a block diagram illustrating a communications system in accordance with one embodiment of the present invention;

FIG. 2 is a block diagram illustrating an Internet Protocol ("IP") phone of FIG. 1 in accordance with one embodiment of the present invention;

DETAILED DESCRIPTION OF EMBODIMENTS OF THE INVENTION

Figure 3:
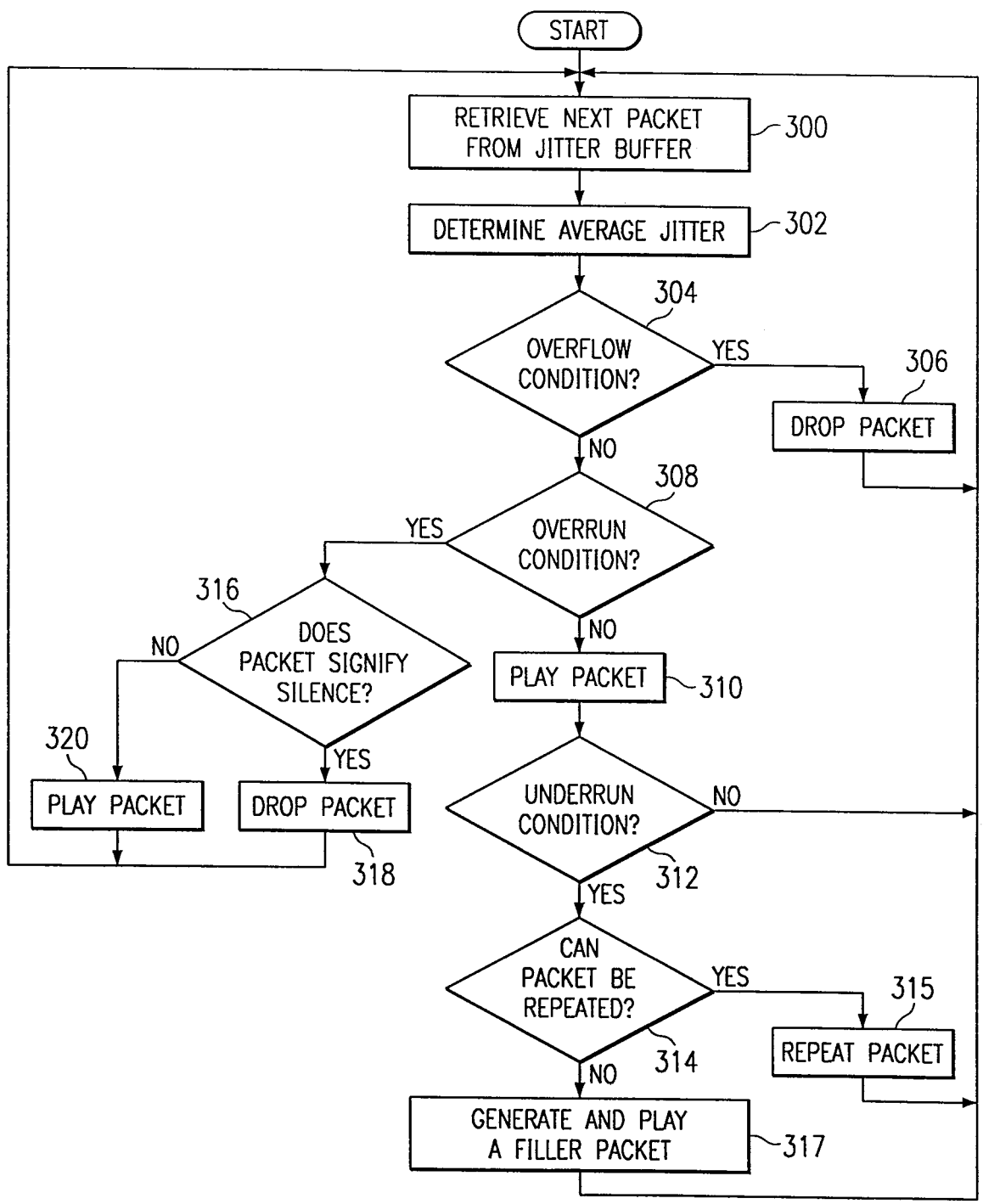
FIG. 3 is a flowchart demonstrating one method for managing time-sensitive packetized data streams at a receiver in accordance with one embodiment of the present invention.

FIG. 1 illustrates one embodiment of a communication system 100 for transporting data between end points. The data transported by communication system 100 includes digital representations of audio, voice, video, text, and/or any other type of information that needs to be delivered in a time-sensitive or real-time manner. Generally, time-sensitive information is real-time or other streaming information, such as audio, voice, or video, that is sampled and/or played at a defined rate and in a defined order so that the information is intelligible to a user. Time-sensitive information may be dropped rather than played out of order. Real-time information is live audio or video.

Communication system 100 includes a packet switched network 102 connecting a plurality of communication devices 200 to each other. Communication system 100 may also connect communication devices 200 to a plurality of analog telephones 104 through a gateway 106 and a public switched telephone network ("PSTN") 108 having a central clock 110. Communication devices 200, analog telephones 104, gateway 106, and central clock 110 are connected to network 102 and/or PSTN 108 through twisted pair, coaxial cable, fiber optic, radio frequency, microwave, or any other suitable wireline or wireless links 112.

In one embodiment, network 102 is an Internet Protocol ("IP") network, such as the Internet; however, network 102 may be other suitable packet-switched networks, such as a frame relay network, an X.25 network, an ATM network, or any other type of network for conveying information from one point to another point. In an embodiment where network 102 is an IP network, network 102 transmits IP packets. For example, telephony voice information may be transmitted in the voice over IP ("VoIP") format. Other types of packets may also be transmitted using other suitable protocols and formats. Network 102 may include any number of devices (not explicitly shown), such as routers, brouters, gateways, IP switches, routing switches, or other types of devices that function to receive a packet, to determine a route for the packet, and to send the packet along the route so that the packet reaches a destination such as communication devices 200.

Communication devices 200, in one embodiment, are IP or other digital telephones; however, communication devices 200 may be other suitable computers or computing devices, personal digital assistants ("PDA"), mobile telephones, or other devices that receive streaming data and generate output intelligible to a user. In a particular embodiment, communication devices 200 communicate voice traffic in the VoIP format. Communication devices 200 are described in more detail below in conjunction with FIG. 2. However, in general, communication devices 200 receive packets of time-sensitive and/or real-time data that are sent through network 102, disassemble packets, and process the packets to send the information to an output in a format intelligible to a user. The packets that are sent through network 102 may come from another communication device 200 or may come from, for example, analog telephones 104 via PSTN 108 and gateway 106.

Analog telephones 104 are standard analog telephones that, for example, one would find in a user's residence. In the illustrated embodiment, analog telephones 104 communicate standard analog telephony signals to PSTN 108 where the analog signals are digitized with the aid of central clock 110. The analog signals are sampled at a rate of substantially 8 kHz before being transmitted to gateway 106 via a digital trunk. Gateway 106 then places the digitized signals into IP packets in the VoIP format before being transmitted over network 102 destined for communication devices 200. In the illustrated embodiment, PSTN 108 is the local, long distance, and international phone system. Gateway 106 is a communication device that connects PSTN 108 to network 102, and may not be needed depending on the set up of system 100. In an alternative embodiment, analog telephones 104 communicate standard analog telephony signals to PSTN 108, through an analog trunk, to gateway 106. In this embodiment, gateway 106 contains an 8 kHz clock that digitizes the analog signals and places the digitized samples into IP packets for transmission over network 102.

In the illustrated embodiment, central clock 110 serves as a timing reference, such that the voice signals of the voice call are sampled at a rate of substantially 8 kHz. When the voice signals are eventually received by communication device 200, via packets, a separate clock within communication device 200 samples voice signals at a rate of substantially 8 kHz, which is intended to be the same sample rate of the original analog signals. However, since central clock 110 and the clock within communication device 200 are independent from one another, the slightest difference in sampling rate eventually causes underflow or overflow of packets. The same problem exists in an embodiment where a voice call is placed between two communication devices 200 or any two other devices sampling and/or playing information based on unsynchronized clocks. This non-synchronization may severely degrade quality of service ("QoS"). As described below in FIGS. 2-4, the present invention uses a receiver-side content prioritization scheme to compensate for lack of synchronization in packet-switched telephony systems.

FIG. 2 illustrates a detailed view of one embodiment of communication device 200 for system 100. As illustrated, communication device 200 includes a network interface 202, a host processor 204, a DSP 206, a coder/decoder ("codec") 208, and a user interface 210.

Network interface 202, in one embodiment, is a network interface card; however, network interface 202 may be other devices suitable for receiving digital signals, such as a modem. Network interface 202 is adapted to couple to one of communication links 112 and is operable to receive time sensitive and/or real-time packets sent over network 102.

Host processor 204 may be a reduced instruction set computing ("RISC") microprocessor, a complex instruction set computing ("CISC") microprocessor, an application specific integrated circuit ("ASIC"), a digital signal processor ("DSP"), or any other device suitable for manipulating digital or electronic information. Host processor 204 is coupled to network interface 202 and is operable to receive packets from network interface 202 and to store the received packets in a jitter buffer 214 via RTP stack 212. Host processor 204 may or may not include other modules. RTP stack 212 uses control data contained in a header of a received packet to sequence the received packets in jitter buffer 214.

Jitter buffer 214 is a storage location for buffering received packets. Jitter buffer 214 may be random access memory ("RAM"), read only memory ("ROM"), or any other type of electromagnetic or optical volatile or non-volatile device for storing information. Jitter buffer 214 is typically sized dynamically and, in one embodiment, functions on a first-in, first-out ("FIFO") basis.

DSP 206 may be a RISC microprocessor, a CISC microprocessor, an ASIC, or any other device suitable for processing digital information and may include logic encoded in computer readable media for doing so. According to the teachings of the present invention, DSP 206 is operable to pull a packet from jitter buffer 214 and determine whether to drop the packet, play the packet, or insert a filler packet into the data stream to enhance the quality of service of system 100. DSP 206 includes a speech analyzer 216 that is an application operable to determine whether a packet can be dropped or, in some cases, repeated. DSP 206 also includes a comfort noise generator 217 that is an application operable to insert a comfort noise packet into the data stream. The details of speech analyzer 216 and comfort noise generator 217 are described more fully below in conjunction with FIGS. 3 and 4.

Codec 208 may be a sound card, a video graphics adapter card, or any other device suitable for inverting digital information contained in packets into analog signals appropriate for user interface 210. Codec 208 utilizes a clock 218 to sample the voice signals at a rate of substantially 8 kHz. Clock 218 may be conventional clock, such as a crystal, well known in the art of telecommunications.

User interface 210, in one embodiment, is a speaker; however, user interface 212 may be other devices suitable for generating output that is intelligible to a user of communication device 200, such as a liquid crystal display or a cathode ray tube display. In addition, there may be one or any number of user interfaces 210.

In operation of one embodiment of communication device 200, network interface 202 continuously receives packets that are part of a time-sensitive data stream sent through network 102. After network interface 202 receives a packet, the packet is directed to jitter buffer 214 with the help of RTP stack 212. Host processor 204 monitors jitter buffer 214 for fullness. In other words, host processor 204 detects overflow, overrun, and underrun conditions of jitter buffer 214. Upon detecting one of these conditions, host processor 204 sets a state for jitter buffer 214 that is monitored by DSP 206. If an overrun condition is detected by host processor 204, then DSP 206 determines whether or not the current packet can be dropped via speech analyzer 216 by analyzing the energy level of the payload signal of the packet. If an underrun condition is detected by host processor 204, then DSP 206 determines whether or not the current packet can be repeated via speech analyzer 216 by analyzing the energy level of the payload signal of the packet, or whether or not a comfort noise packet needs to be inserted via comfort noise generator 217. Once DSP 206 determines whether the packet can be played, the packet is sent to codec 208 which converts the digital signals contained in the packet into analog signals that are useful to user interface 210. The analog signals are then sent to user interface 210, which generates output intelligible to a user of communication device 200. Filler packets and repeated packets are similarly processed.

In other embodiments, communication device 200 has fewer operations, additional operations, and/or a different distribution of operations. For example, host processor 204 may perform all of the operations of DSP 206, making DSP 206 unnecessary. Conversely, DSP 206 may perform all of the operations of host processor 204, making host processor 204 unnecessary.

According to the teachings of the present invention, a receive-side content prioritization scheme is employed to compensate for lack of synchronization in packet-switched telephony systems. The details of this receive-side content prioritization scheme is outlined below in conjunction with FIGS. 3 and 4. The methods described in FIGS. 3 and 4 are implemented, according to the teachings of the present invention, on a receive-side communication device 200.

Figure 4:
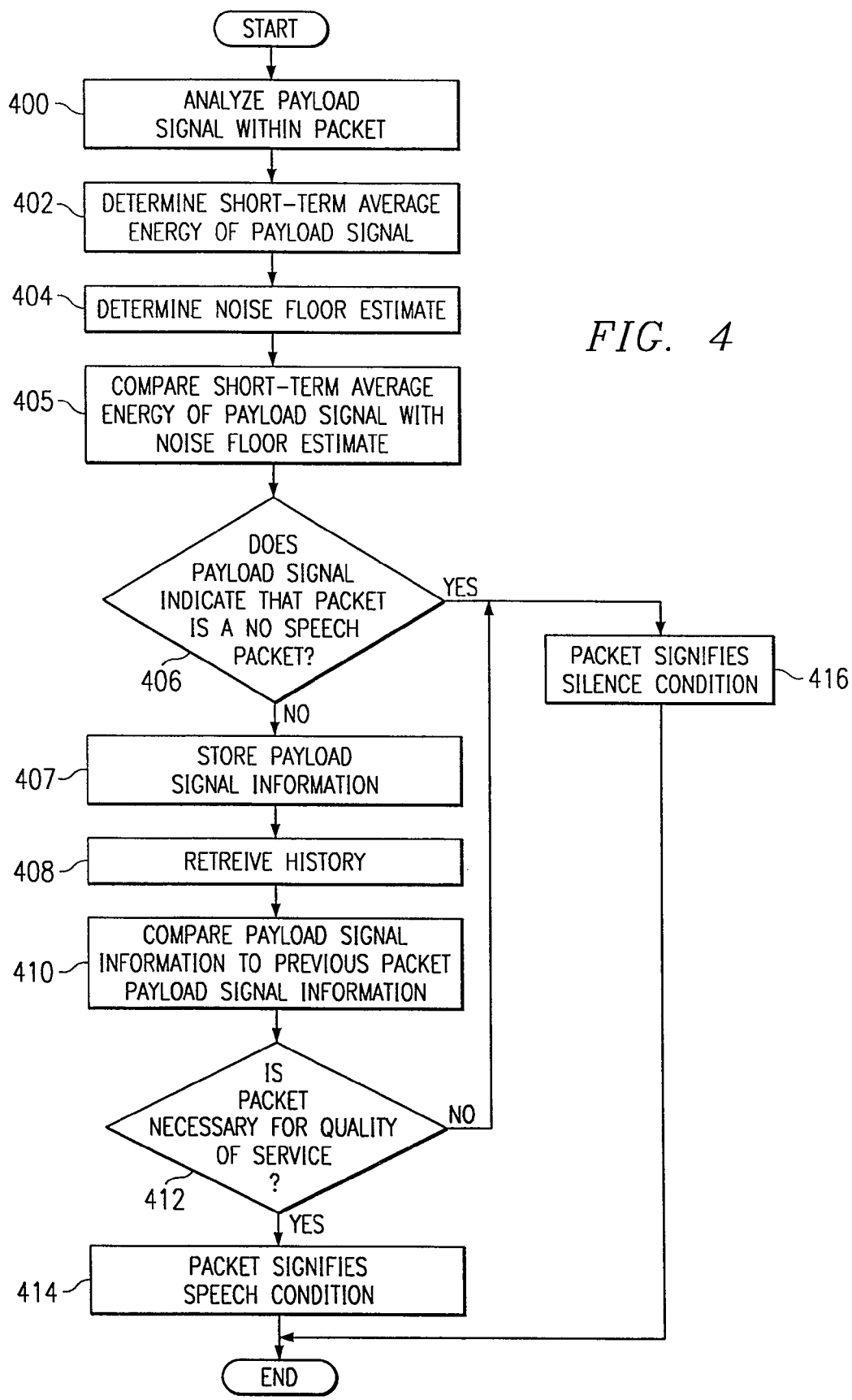
FIG. 4 is a flowchart demonstrating one method for determining whether a packet signifies a speech condition or a silence condition in accordance with one embodiment of the present invention.

FIG. 3 is a flowchart demonstrating one method for managing time-sensitive packetized data streams at a receiver in accordance with one embodiment of the present invention. As described above, jitter buffer 214 stores packets that are received from network 102. DSP 206 retrieves the next packet to be played from jitter buffer 214 at step 300. An average jitter is determined at step 302. The determination in step 302 is a step that monitors the fullness of jitter buffer 214. In one embodiment, host processor monitors the fullness of jitter buffer 214 and sets an overflow, overrun, or underrun condition. This condition setting may be based on an absolute number of packets or a relative number packets. In other words, if clock 218 of communication device 200 has a slightly slower sampling rate than central clock 110 (FIG. 1) then a buildup of packets may occur in jitter buffer 214. Conversely, if clock 218 has a slightly faster sampling rate than central clock 110 (FIG. 1) then a starvation of packets may occur in jitter buffer 214.

At decisional step 304, a determination is made by host processor 204 of whether an overflow condition exists in jitter buffer 214. An overflow condition exists when jitter buffer 214 is full and cannot handle any more packets or is danger of overflowing. If an overflow condition exists, then the retrieved packet is dropped at step 306 and the method proceeds again at step 300 as described above. If an overflow condition does not exist, then a determination is made of whether an overrun condition exists in jitter buffer 214 at decisional step 308. An overrun condition exists in jitter buffer 214 when the number of packets exceed a predefined threshold. In other words, packets are starting to buildup in jitter buffer 214, but an overflow condition does not yet exist. If a determination is made at step 308 that an overrun condition does not exist then the packet is played at step 310. Then, at decisional step 312, a determination is made of whether an underrun condition exists. An underrun condition exists in jitter buffer 214 when the number of packets are below a predefined threshold. In other words, jitter buffer 214 is being starved of packets. If an under run condition does not exist then the method continues at step 300 as outlined above. However, if an underrun condition does exist, then host processor 204 can either repeat the previous packet or insert a packet, such as a comfort noise packet generated by comfort noise generator 217. Host processor accomplishes this by determining, at step 314, whether the present packet can be repeated. If the present packet can be repeated, then the packet is repeated at step 315 and the method continues at step 300. If the present packet cannot be repeated, then a comfort noise packet is generated by comfort noise generator 217 and played at step 317 and the method continues at step 300.

Referring back to decisional step 308, if an overrun condition exists in jitter buffer 214, then a determination is made of whether the next packet can be dropped at decisional step 316 by determining if the packet signifies a speech condition or a silence condition. If a determination is made that the next packet can be dropped, then the packet is dropped at step 318 before the method continues back at step 300. If a determination is made that the next packet cannot be dropped, the next packet is played at step 320 and the method continues back at step 300. Decisional step 316 is facilitated by speech analyzer 216 of DSP 206, the details of which are described below in conjunction with FIG. 4.

FIG. 4 is a flowchart demonstrating one method for determining whether a packet signifies a silence condition or a speech condition in accordance with one embodiment of the present invention. The method described in FIG. 4 is handled, in one embodiment, by speech analyzer 216 of DSP 206. The method begins at step 400 where a payload signal within a received packet is analyzed. Accordingly, a short term average energy of the payload signal is determined at step 402 and a noise floor estimate is determined at step 404. The noise floor estimate is a static or dynamic noise level that separates a packet that signifies a speech packet from one that signifies a silence packet. For example, a noise floor estimate may be −60 to −70 decibels in a quiet room or −40 to −50 decibels in a somewhat noisy room. The noise floor estimate is stored or determined based on background noise and may be any suitable value.

The method continues at step 405, which compares the short term average energy of the payload signal and the noise floor estimate. Then, at step 406, a determination is made of whether or not the packet is a no-speech packet. If a determination is made that the packet is a no-speech packet, then the packet signifies a silence condition as denoted by box 416. For example, in a particular embodiment, when the short term average energy level of the payload signal is less than the noise floor estimate, then the packet signifies a silence condition.

If a determination is made at decisional step 406 that the packet is not a no-speech packet, then the payload signal information is stored at step 407 and a previous packet payload signal is retrieved from a history at step 408. The payload signal is then compared, at step 410, to the payload signal of the previous packet. Step 410 looks at the energy of each frequency band in each of the payload signals to determine if the two packets represent voice signals that are similar enough such that if the current packet was dropped, there is little or no impact on intelligibility to the user. Accordingly, at decisional step 412, a determination is made of whether the current packet is necessary for QoS. If yes, then the packet signifies a speech condition as illustrated by box 414. However, if not, then the packet signifies a silence condition as illustrated by box 416.

Steps indicated by reference numerals 407, 408, 410, 412, 414, and 416, generally define a basic auto correlation algorithm. Auto correlation techniques essentially determine voiced speech segments. In other words, if a long period of time goes by without a noise period, then a time base correction is required. Therefore, an algorithm looks for voiced speech segments in the voice signals contained in the packets that are periodic in nature such that the voiced speech segments can be shortened or lengthened with little impact on intelligibility. Linear predictive techniques may also be used instead of auto correlation techniques.

In some embodiments, the steps for managing time-sensitive packetized data streams at a receiver can be implemented using a set of logic encoded in media and executed by a processor.

Although the present invention has been described with several example embodiments, various changes and modifications may be suggested to one skilled in the art. The present invention intends to encompass those changes and modifications as they fall within the scope of the claims.

What is claimed is:

1. A method for managing time-sensitive packetized data streams at a receiver, comprising:
    receiving a time-sensitive current packet of a data stream;
    determining whether the current packet represents a voice signal;
    upon determining that the current packet represents a voice signal, comparing an energy of a frequency band of a payload signal of the current packet to an energy of a frequency band of a payload signal of a previous packet to determine if the current packet and the previous packet represent voice signals that are similar such that dropping the current packet would result in minimal impact on intelligibility to the user; and
    dropping the current packet upon determining that the current packet and the previous packet represent voice signals that are similar such that dropping the current packet would result in minimal impact on intelligibility to the user.

2. The method of claim 1, wherein the time-sensitive current packet comprises a real-time packet.

3. The method of claim 1, wherein the payload signal is a voice signal.

4. The method of claim 1, wherein determining whether the current packet represents a voice signal comprises:
    determining a short term average energy of the payload signal of the current packet;
    determining a noise floor estimate; and
    comparing the short term average energy and the noise floor estimate.

5. The method of claim 1, further comprising storing the payload signal of the current packet.

6. A system for managing time-sensitive packetized data streams at a receiver, comprising:
    an interface operable to receive a time-sensitive current packet of a data stream; and
    a processor coupled to the interface and operable to:
        determine whether the current packet represents a voice signal;
        upon determining that the current packet represents a voice signal, compare an energy of a frequency band of a payload signal of the current packet to an energy of a frequency band of a payload signal of a previous packet to determine if the current packet and the previous packet represent voice signals that are similar such that dropping the current packet would result in minimal impact on intelligibility to the user; and
        drop the current packet upon determining that the current packet and the previous packet represent voice signals that are similar such that dropping the current packet would result in minimal impact on intelligibility to the user.

7. The system of claim 6, wherein the time-sensitive current packet comprises a real-time packet.

8. The system of claim 6, wherein the payload signal is a voice signal.

9. The system of claim 6, wherein a processor operable to determine whether the current packet represents a voice signal is operable to:
    determine a short term average energy of the payload signal of the current packet;
    determine a noise floor estimate; and
    compare the short term average energy and the noise floor estimate.

10. The system of claim 6, wherein the processor is further operable to store the payload signal of the current packet.

11. A set of logic encoded in non-transitory computer-readable media for managing time-sensitive packetized data streams at a receiver, the logic, when executed by a processor, operable to:
    receive a time-sensitive current packet of a data stream;
    determine whether the current packet represents a voice signal;
    upon determining that the current packet represents a voice signal, compare an energy of a frequency band of a payload signal of the current packet to an energy of a frequency band of a payload signal of a previous packet to determine if the current packet and the previous packet represent voice signals that are similar such that dropping the current packet would result in minimal impact on intelligibility to the user; and
    drop the current packet upon determining that the current packet and the previous packet represent voice signals that are similar such that dropping the current packet would result in minimal impact on intelligibility to the user.

12. The logic of claim 11, wherein the time-sensitive current packet comprises a real-time packet.

13. The logic of claim 11, wherein the payload signal is a voice signal.

14. The logic of claim 11, wherein logic operable to determine whether the current packet represents a voice signal comprises logic operable to:
    determine a short term average energy of the payload signal of the current packet;

determine a noise floor estimate; and
compare the short term average energy and the noise floor estimate.

15. The logic of claim 11, further operable to store the payload signal of the current packet.

16. A system for managing time-sensitive packetized data streams at a receiver, comprising:
  means for receiving a current packet of a data stream;
  means for determining whether the current packet represents a voice signal;
  means for comparing, upon determining that the current packet represents a voice signal, an energy of a frequency band of a payload signal of the current packet to an energy of a frequency band of a payload signal of a previous packet to determine if the current packet and the previous packet represent voice signals that are similar such that dropping the current packet would result in minimal impact on intelligibility to the user; and
  means for dropping the current packet upon determining that the current packet and the previous packet represent voice signals that are similar such that dropping the current packet would result in minimal impact on intelligibility to the user.

17. The system of claim 16, further comprising means for storing the payload signal of the current packet.

* * * * *